United States Patent
Qiu et al.

(10) Patent No.: US 12,391,414 B2
(45) Date of Patent: Aug. 19, 2025

(54) UNMANNED AERIAL VEHICLE BASE STATION AND UNMANNED AERIAL VEHICLE SYSTEM

(71) Applicant: SZ DJI TECHNOLOGY CO., LTD., Guangdong (CN)

(72) Inventors: Li Qiu, Guangdong (CN); Di Zhang, Guangdong (CN); Yi Liu, Guangdong (CN); Chi Zhang, Guangdong (CN); Pan Zhang, Guangdong (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/396,744

(22) Filed: Dec. 27, 2023

(65) Prior Publication Data
US 2024/0132238 A1   Apr. 25, 2024

Related U.S. Application Data

(63) Continuation of application No. PCT/CN2022/079906, filed on Mar. 9, 2022.

(51) Int. Cl.
*B64U 70/92* (2023.01)
*B64U 80/70* (2023.01)

(52) U.S. Cl.
CPC ............. *B64U 70/92* (2023.01); *B64U 80/70* (2023.01)

(58) Field of Classification Search
CPC ........ B64U 70/92; B64U 80/70; B64U 70/00; B64U 70/93; B64F 1/005; B64F 1/007; B64C 29/02; E05F 15/63; E05F 15/46
See application file for complete search history.

(56) References Cited

U.S. PATENT DOCUMENTS

| | | | | |
|---|---|---|---|---|
| 3,253,806 A | * | 5/1966 | Eickmann | B64C 27/12 244/17.23 |
| 3,483,696 A | * | 12/1969 | Gilbert | B64C 27/08 416/157 R |

(Continued)

FOREIGN PATENT DOCUMENTS

| | | |
|---|---|---|
| CN | 207029853 U | 2/2018 |
| CN | 108945502 A | 12/2018 |

(Continued)

OTHER PUBLICATIONS

International Search Report and Written Opinion mailed on Nov. 28, 2022, received for PCT Application PCT/CN2022/079906, filed on Mar. 9, 2022, 9 pages including English Translation.

*Primary Examiner* — Medhat Badawi
(74) *Attorney, Agent, or Firm* — ANOVA LAW GROUP, PLLC

(57) ABSTRACT

A base station may include a base body, a landing pad, and a base station opening and closing structure. The base station opening and closing structure may include an open state and a closed state. In the open state, the base station opening and closing structure may provide a landing space for an aerial vehicle to land on the landing pad, and in the closed state, the base station opening and closing structure may provide an accommodating space to accommodate the aerial vehicle. During a process of the base station opening and closing structure transitioning from the open state to the closed state, the base station opening and closing structure may be configured to propel some blades of the aerial vehicle partially protruding out of the accommodating space to fold or retract so as to accommodate the aerial vehicle within the accommodating space.

18 Claims, 10 Drawing Sheets

(56) References Cited

U.S. PATENT DOCUMENTS

| | | | | |
|---|---|---|---|---|
| 4,262,712 A * | 4/1981 | Young | B67D 7/54 | |
| | | | 141/DIG. 1 | |
| 7,334,755 B2 * | 2/2008 | Svoboda, Jr. | B64C 27/08 | |
| | | | 244/17.23 | |
| 8,052,081 B2 * | 11/2011 | Olm | B64U 10/13 | |
| | | | 244/17.23 | |
| 8,245,469 B2 * | 8/2012 | Rubel | E04B 5/48 | |
| | | | 52/223.6 | |
| 8,256,172 B2 * | 9/2012 | Benson | E04F 15/02183 | |
| | | | 52/489.1 | |
| 8,511,606 B1 * | 8/2013 | Lutke | B64U 80/40 | |
| | | | 320/109 | |
| 9,050,997 B1 * | 6/2015 | Schramm | B62D 15/0215 | |
| 9,056,676 B1 * | 6/2015 | Wang | B64F 1/22 | |
| 9,126,693 B1 * | 9/2015 | Shi | G05B 11/42 | |
| 9,290,277 B2 * | 3/2016 | You | B64U 50/34 | |
| 9,387,928 B1 * | 7/2016 | Gentry | B64U 50/39 | |
| 9,421,869 B1 * | 8/2016 | Ananthanarayanan | | |
| | | | B60L 5/005 | |
| 9,446,858 B2 * | 9/2016 | Hess | B64F 3/02 | |
| 9,457,899 B2 * | 10/2016 | Duffy | B64U 10/16 | |
| 9,527,605 B1 * | 12/2016 | Gentry | G05D 1/0094 | |
| 9,551,989 B2 * | 1/2017 | Scarlatti | G05D 1/00 | |
| 9,589,448 B1 * | 3/2017 | Schneider | F41H 9/10 | |
| 9,643,722 B1 * | 5/2017 | Myslinski | G05D 1/689 | |
| 9,718,564 B1 * | 8/2017 | Beckman | G08G 5/57 | |
| 9,783,075 B2 * | 10/2017 | Henry | G05D 1/654 | |
| 9,783,301 B2 * | 10/2017 | Schliwa | B64D 11/0007 | |
| 9,957,045 B1 * | 5/2018 | Daly | B64U 50/19 | |
| 10,099,561 B1 * | 10/2018 | Ananthanarayanan | | |
| | | | B60L 53/126 | |
| 10,099,785 B1 * | 10/2018 | Gonzalez | B64U 50/31 | |
| 10,176,722 B1 * | 1/2019 | Boyd | G08G 5/57 | |
| 10,268,208 B1 * | 4/2019 | Hopwood Thomas | | |
| | | | G05D 1/0676 | |
| 10,287,033 B2 * | 5/2019 | Hu | B64F 1/04 | |
| 10,310,501 B2 * | 6/2019 | Greenberger | H02J 7/342 | |
| 10,467,685 B1 * | 11/2019 | Brisson | B64F 1/222 | |
| 10,526,094 B2 * | 1/2020 | Cheng | B64U 80/70 | |
| 10,719,080 B2 * | 7/2020 | Zhang | B64F 5/60 | |
| 10,745,102 B2 * | 8/2020 | Nysæter | B64U 30/20 | |
| D903,576 S * | 12/2020 | Feldman | D12/345 | |
| 10,899,436 B2 * | 1/2021 | Gentry | B64C 25/001 | |
| 10,967,970 B2 * | 4/2021 | Van Niekerk | B64U 30/293 | |
| 11,079,752 B1 * | 8/2021 | Lombardini | B64U 50/19 | |
| 11,111,033 B1 * | 9/2021 | Burks | B64U 50/34 | |
| D932,369 S * | 10/2021 | Passley | D12/16.1 | |
| 11,148,808 B2 * | 10/2021 | Wiggerich | B64U 30/26 | |
| 11,370,561 B2 * | 6/2022 | Ratajczak | B60L 53/14 | |
| 11,534,801 B2 * | 12/2022 | Volta | B66F 9/063 | |
| 11,572,197 B1 * | 2/2023 | Nevdahs | B64F 1/362 | |
| 11,597,515 B2 * | 3/2023 | Passley | B64F 1/007 | |
| 11,597,516 B1 * | 3/2023 | Klinkmueller | B64U 70/20 | |
| 11,603,218 B2 * | 3/2023 | Fisher | B64F 1/04 | |
| 11,603,219 B2 * | 3/2023 | Ratajczak | B64U 30/20 | |
| 11,636,771 B2 * | 4/2023 | Barker | B64U 50/39 | |
| | | | 701/16 | |
| 11,641,966 B2 * | 5/2023 | Nakanishi | A47G 29/124 | |
| | | | 232/44 | |
| 11,667,402 B2 * | 6/2023 | Liske | B64U 50/37 | |
| | | | 244/116 | |
| 11,673,690 B2 * | 6/2023 | Dayan | B64U 80/70 | |
| | | | 244/114 R | |
| 11,710,092 B2 * | 7/2023 | Dearing | G07C 9/00896 | |
| | | | 705/330 | |
| 11,713,136 B2 * | 8/2023 | Foggia | B64U 80/10 | |
| | | | 244/114 R | |
| 11,714,189 B2 * | 8/2023 | Padmanabhan | G01S 19/51 | |
| | | | 342/22 | |
| 11,738,867 B2 * | 8/2023 | Ehasoo | B60L 5/18 | |
| | | | 244/17.11 | |
| 11,741,422 B2 * | 8/2023 | Gil | B65G 1/0478 | |
| | | | 705/338 | |
| 11,748,688 B2 * | 9/2023 | Ur | B64C 39/024 | |
| | | | 705/332 | |
| 11,760,485 B2 * | 9/2023 | Wabnegger | H02G 1/02 | |
| | | | 244/121 | |
| 11,767,129 B2 * | 9/2023 | Warwick | B64C 39/024 | |
| | | | 244/137.1 | |
| 11,772,814 B2 * | 10/2023 | Dubois | B64U 70/83 | |
| | | | 244/110 E | |
| 11,776,136 B1 * | 10/2023 | Pachikov | B64U 10/13 | |
| | | | 244/17.23 | |
| 11,780,606 B2 * | 10/2023 | Carthew | B64U 70/99 | |
| | | | 244/114 R | |
| 11,794,894 B2 * | 10/2023 | Brock | B64U 30/20 | |
| 11,794,922 B1 * | 10/2023 | Twyford | B64U 80/25 | |
| 11,814,191 B2 * | 11/2023 | Cheng | B64U 60/50 | |
| 11,814,241 B2 * | 11/2023 | Tian | B60P 3/11 | |
| 11,840,152 B2 * | 12/2023 | Fisher | B64C 29/02 | |
| 11,851,209 B2 * | 12/2023 | Fisher | B64F 1/005 | |
| 11,858,662 B2 * | 1/2024 | Gil | B64U 70/70 | |
| 11,866,168 B2 * | 1/2024 | Cooper | B64U 70/97 | |
| 11,884,422 B2 * | 1/2024 | Lowe | H01Q 1/22 | |
| 11,898,368 B2 * | 2/2024 | Blake | G08G 5/57 | |
| 11,900,823 B2 * | 2/2024 | Surace | G05D 1/0676 | |
| 11,932,315 B2 * | 3/2024 | Hwang | B64F 1/32 | |
| 11,939,046 B1 * | 3/2024 | Berry | B64C 39/024 | |
| 11,939,057 B2 * | 3/2024 | Hamm | B64U 20/70 | |
| 11,939,080 B2 * | 3/2024 | Cowden | B64U 80/30 | |
| 11,939,083 B2 * | 3/2024 | Baklycki | B64U 70/90 | |
| 12,059,089 B1 * | 8/2024 | Dunn | A47G 29/141 | |
| 12,084,211 B2 * | 9/2024 | Li | B64U 70/99 | |
| 12,091,194 B2 * | 9/2024 | Wang | E05F 15/63 | |
| 12,168,533 B1 * | 12/2024 | Hinman | B64U 70/97 | |
| 12,195,213 B2 * | 1/2025 | Qi | B64U 70/97 | |
| 2004/0256519 A1 * | 12/2004 | Ellis | B64F 1/125 | |
| | | | 244/110 E | |
| 2005/0061910 A1 * | 3/2005 | Wobben | B64C 29/00 | |
| | | | 244/17.23 | |
| 2005/0178894 A1 * | 8/2005 | McGeer | B64F 1/06 | |
| | | | 244/63 | |
| 2006/0038067 A1 * | 2/2006 | Dennis | B64U 70/50 | |
| | | | 244/63 | |
| 2006/0249622 A1 * | 11/2006 | Steele | B64U 70/30 | |
| | | | 244/115 | |
| 2007/0176432 A1 * | 8/2007 | Rolt | F03D 9/255 | |
| | | | 290/55 | |
| 2008/0217486 A1 * | 9/2008 | Colten | B64U 10/25 | |
| | | | 244/45 R | |
| 2009/0057486 A1 * | 3/2009 | Becht, IV | B64F 1/007 | |
| | | | 244/114 R | |
| 2010/0170993 A1 * | 7/2010 | Misegades | B64C 7/00 | |
| | | | 244/130 | |
| 2010/0320313 A1 * | 12/2010 | Hanafin | B64F 1/125 | |
| | | | 244/114 R | |
| 2011/0174925 A1 * | 7/2011 | Ying | B64F 1/005 | |
| | | | 701/16 | |
| 2012/0080556 A1 * | 4/2012 | Root, Jr. | B64F 1/06 | |
| | | | 73/170.28 | |
| 2013/0233964 A1 * | 9/2013 | Woodworth | B64U 10/60 | |
| | | | 244/175 | |
| 2013/0344778 A1 * | 12/2013 | Schafer | B24B 41/02 | |
| | | | 451/294 | |
| 2014/0124621 A1 * | 5/2014 | Godzdanker | B64F 1/28 | |
| | | | 244/110 E | |
| 2014/0257595 A1 * | 9/2014 | Tillmann | B64U 10/14 | |
| | | | 701/2 | |
| 2014/0319272 A1 * | 10/2014 | Casado | B60L 3/12 | |
| | | | 244/110 E | |
| 2015/0069968 A1 * | 3/2015 | Pounds | B60L 53/35 | |
| | | | 320/109 | |
| 2015/0123462 A1 * | 5/2015 | Kamradt | B67D 7/02 | |
| | | | 141/192 | |
| 2015/0158599 A1 * | 6/2015 | Sisko | B64F 1/20 | |
| | | | 244/114 R | |
| 2015/0175276 A1 * | 6/2015 | Koster | A47G 29/14 | |
| | | | 244/114 R | |
| 2015/0183528 A1 * | 7/2015 | Walsh | B64F 1/32 | |
| | | | 244/114 R | |

(56) References Cited

U.S. PATENT DOCUMENTS

| | | | |
|---|---|---|---|
| 2015/0336669 A1* | 11/2015 | Kantor | G01C 21/343 701/3 |
| 2015/0336677 A1* | 11/2015 | Smaoui | H02J 7/0045 320/109 |
| 2015/0363843 A1* | 12/2015 | Loppatto | G06Q 30/0283 705/330 |
| 2016/0001883 A1* | 1/2016 | Sanz | B64U 10/13 244/17.23 |
| 2016/0003637 A1* | 1/2016 | Andersen | G01C 21/362 701/519 |
| 2016/0011592 A1* | 1/2016 | Zhang | G05D 1/10 244/114 R |
| 2016/0023761 A1* | 1/2016 | McNally | G05D 1/0094 701/3 |
| 2016/0039541 A1* | 2/2016 | Beardsley | B60L 53/14 701/2 |
| 2016/0068264 A1* | 3/2016 | Ganesh | G08G 5/55 701/4 |
| 2016/0068265 A1* | 3/2016 | Hoareau | G06Q 10/08 701/3 |
| 2016/0101856 A1* | 4/2016 | Kohstall | G05D 1/0669 244/17.23 |
| 2016/0130000 A1* | 5/2016 | Rimanelli | B64U 20/50 244/2 |
| 2016/0131025 A1* | 5/2016 | Pekrul | F02B 53/10 123/205 |
| 2016/0144982 A1* | 5/2016 | Sugumaran | B64F 1/005 244/108 |
| 2016/0185466 A1* | 6/2016 | Dreano, Jr. | G06Q 10/083 705/26.81 |
| 2016/0194959 A1* | 7/2016 | Pekrul | F01C 19/06 418/146 |
| 2016/0196756 A1* | 7/2016 | Prakash | G08G 5/54 701/3 |
| 2016/0200438 A1* | 7/2016 | Bokeno | G05D 1/102 244/2 |
| 2016/0207627 A1* | 7/2016 | Hoareau | B64D 1/02 |
| 2016/0229299 A1* | 8/2016 | Streett | B64F 1/222 |
| 2016/0244162 A1* | 8/2016 | Weller | B64U 10/13 |
| 2016/0244187 A1* | 8/2016 | Byers | G06Q 10/0832 |
| 2016/0257423 A1* | 9/2016 | Martin | B64U 50/34 |
| 2016/0257426 A1* | 9/2016 | Mozer | B64F 1/362 |
| 2016/0272317 A1* | 9/2016 | Cho | G08G 1/162 |
| 2016/0280371 A1* | 9/2016 | Canavor | H04W 4/029 |
| 2016/0286128 A1* | 9/2016 | Zhou | H04L 65/762 |
| 2016/0291445 A1* | 10/2016 | Fisher, Sr. | F16M 11/10 |
| 2016/0304198 A1* | 10/2016 | Jourdan | G08G 5/57 |
| 2016/0304217 A1* | 10/2016 | Fisher | G05D 1/0011 |
| 2016/0307448 A1* | 10/2016 | Salnikov | A01C 21/00 |
| 2016/0311329 A1* | 10/2016 | Rodriguez | B60L 58/18 |
| 2016/0340016 A1* | 11/2016 | Tang | B63C 9/01 |
| 2016/0340021 A1* | 11/2016 | Zhang | B64C 27/006 |
| 2016/0355261 A1* | 12/2016 | Chin | B64U 70/20 |
| 2016/0364989 A1* | 12/2016 | Speasl | G08G 5/57 |
| 2016/0378108 A1* | 12/2016 | Paczan | B64C 37/02 705/330 |
| 2017/0011333 A1* | 1/2017 | Greiner | G06K 7/10722 |
| 2017/0015415 A1* | 1/2017 | Chan | G06Q 30/04 |
| 2017/0021941 A1* | 1/2017 | Fisher | B64U 10/20 |
| 2017/0021942 A1* | 1/2017 | Fisher | B64U 70/80 |
| 2017/0023949 A1* | 1/2017 | Fisher | G08G 5/55 |
| 2017/0050749 A1* | 2/2017 | Pilskalns | B60L 53/14 |
| 2017/0073085 A1* | 3/2017 | Tremblay | A47G 29/141 |
| 2017/0081043 A1* | 3/2017 | Jones | B64C 37/02 |
| 2017/0096222 A1* | 4/2017 | Spinelli | B64U 80/25 |
| 2017/0117676 A1* | 4/2017 | James | B64U 70/90 |
| 2017/0121023 A1* | 5/2017 | High | B64D 9/00 |
| 2017/0129464 A1* | 5/2017 | Wang | H02J 7/0045 |
| 2017/0129603 A1* | 5/2017 | Raptopoulos | B64F 1/22 |
| 2017/0132558 A1* | 5/2017 | Perez | G06Q 10/083 |
| 2017/0137118 A1* | 5/2017 | Gentry | B64D 1/02 |
| 2017/0144776 A1* | 5/2017 | Fisher | B64U 10/25 |
| 2017/0158352 A1* | 6/2017 | von Flotow | B64C 27/26 |
| 2017/0158353 A1* | 6/2017 | Schmick | B60L 53/12 |
| 2017/0174335 A1* | 6/2017 | Malloy | B64D 35/04 |
| 2017/0190443 A1* | 7/2017 | Fisher | B64F 1/005 |
| 2017/0203632 A1* | 7/2017 | Westendarp | B60H 1/00378 |
| 2017/0203857 A1* | 7/2017 | O'Toole | A47G 29/141 |
| 2017/0225782 A1* | 8/2017 | Kohstall | B64U 30/26 |
| 2017/0225799 A1* | 8/2017 | Selwyn | B64F 1/005 |
| 2017/0225802 A1* | 8/2017 | Lussier | B64U 10/14 |
| 2017/0240291 A1* | 8/2017 | Kim | H01M 16/006 |
| 2017/0247120 A1* | 8/2017 | Miller | B64U 20/83 |
| 2017/0253349 A1* | 9/2017 | Wang | B64U 70/97 |
| 2017/0270314 A1* | 9/2017 | Tsybrovskyy | H04W 12/06 |
| 2017/0275025 A1* | 9/2017 | Johnson | B64F 1/362 |
| 2017/0283090 A1* | 10/2017 | Miller | B64U 70/97 |
| 2017/0305575 A1* | 10/2017 | Bash | B64F 1/32 |
| 2017/0308850 A1* | 10/2017 | Roush | G01C 21/343 |
| 2017/0316701 A1* | 11/2017 | Gil | B60P 3/11 |
| 2017/0323129 A1* | 11/2017 | Davidson | G05D 1/0234 |
| 2017/0327091 A1* | 11/2017 | Capizzo | H01M 10/30 |
| 2017/0341769 A1* | 11/2017 | Haberbusch | F17C 5/007 |
| 2018/0039286 A1* | 2/2018 | Tirpak | B64U 80/25 |
| 2018/0053139 A1* | 2/2018 | Stoman | B64U 10/13 |
| 2018/0056794 A1* | 3/2018 | Kim | B60L 53/126 |
| 2018/0092345 A1* | 4/2018 | Okumura | F41G 7/2253 |
| 2018/0092484 A1* | 4/2018 | Lewis | G08G 5/54 |
| 2018/0105020 A1* | 4/2018 | Smith | B60H 1/262 |
| 2018/0105289 A1* | 4/2018 | Walsh | B60L 53/30 |
| 2018/0118340 A1* | 5/2018 | Russo | B64U 50/37 |
| 2018/0118374 A1* | 5/2018 | Lombardini | B64F 3/02 |
| 2018/0194484 A1* | 7/2018 | Livieratos | F02D 13/0269 |
| 2018/0196418 A1* | 7/2018 | Meier | G05D 1/0206 |
| 2018/0233055 A1* | 8/2018 | Damnjanovic | G08G 5/57 |
| 2018/0237161 A1* | 8/2018 | Minnick | B64U 50/37 |
| 2018/0245365 A1* | 8/2018 | Wankewycz | B64U 10/13 |
| 2018/0265295 A1* | 9/2018 | Beckman | G08G 5/57 |
| 2018/0265296 A1* | 9/2018 | Beckman | B64U 70/90 |
| 2018/0295327 A1* | 10/2018 | Yearwood | B25J 11/002 |
| 2018/0312276 A1* | 11/2018 | Miller | B64U 10/14 |
| 2018/0319496 A1* | 11/2018 | Zhang | B64U 20/50 |
| 2018/0327091 A1* | 11/2018 | Burks | B64U 50/13 |
| 2018/0354649 A1* | 12/2018 | Ortiz | G08B 13/1436 |
| 2018/0357910 A1* | 12/2018 | Hobbs | B64C 27/00 |
| 2018/0364740 A1* | 12/2018 | Collins | G05D 1/0088 |
| 2018/0370618 A1* | 12/2018 | Harris | B64C 25/24 |
| 2019/0009926 A1* | 1/2019 | Hu | B64U 70/99 |
| 2019/0016476 A1* | 1/2019 | Scherz | H02J 7/0042 |
| 2019/0023133 A1* | 1/2019 | Renold | B60L 53/35 |
| 2019/0023416 A1* | 1/2019 | Borko | B66C 7/08 |
| 2019/0028904 A1* | 1/2019 | Carpenter | G08G 5/76 |
| 2019/0047462 A1* | 2/2019 | Vijayaraghavan | B60W 30/00 |
| 2019/0055018 A1* | 2/2019 | Bei | B64U 70/92 |
| 2019/0100108 A1* | 4/2019 | Davis | B64U 80/84 |
| 2019/0100313 A1* | 4/2019 | Campbell | B64U 10/14 |
| 2019/0106224 A1* | 4/2019 | Nishikawa | B64U 80/70 |
| 2019/0108472 A1* | 4/2019 | Sweeney | G06Q 10/083 |
| 2019/0135403 A1* | 5/2019 | Perry | B64U 10/25 |
| 2019/0152326 A1* | 5/2019 | Nishikawa | B64U 50/19 |
| 2019/0161190 A1* | 5/2019 | Gil | E05F 15/77 |
| 2019/0193952 A1* | 6/2019 | Zevenbergen | B64U 80/25 |
| 2019/0217952 A1* | 7/2019 | Zawadzki | B64D 1/02 |
| 2019/0233103 A1* | 8/2019 | High | A47G 29/141 |
| 2019/0233107 A1* | 8/2019 | Tian | B64C 39/12 |
| 2019/0245365 A1* | 8/2019 | Farrahi Moghaddam | H02J 7/0042 |
| 2019/0256201 A1* | 8/2019 | Plekhanov | B64U 20/40 |
| 2019/0256202 A1* | 8/2019 | Resnick | B64U 10/13 |
| 2019/0256207 A1* | 8/2019 | Nohmi | G05D 1/0866 |
| 2019/0258910 A1* | 8/2019 | Stoman | G06K 19/06028 |
| 2019/0263519 A1* | 8/2019 | Argus | B64U 50/11 |
| 2019/0270526 A1* | 9/2019 | Hehn | B64U 80/70 |
| 2019/0283871 A1* | 9/2019 | Wieczorek | B64U 10/60 |
| 2019/0291961 A1* | 9/2019 | Urban | G06Q 50/40 |
| 2019/0308724 A1* | 10/2019 | Cooper | B64U 80/25 |
| 2019/0315235 A1* | 10/2019 | Kung | B64U 50/39 |
| 2019/0348862 A1* | 11/2019 | Obayashi | H02J 50/90 |
| 2019/0383052 A1* | 12/2019 | Blake | G08G 5/22 |
| 2020/0017218 A1* | 1/2020 | Ahmad | B64D 9/00 |
| 2020/0017237 A1* | 1/2020 | Walker | B64F 1/362 |
| 2020/0036243 A1* | 1/2020 | Zhao | H02K 1/145 |

(56) References Cited

U.S. PATENT DOCUMENTS

| | | |
|---|---|---|
| 2020/0044463 A1* | 2/2020 | Kim .................. B64U 10/14 |
| 2020/0055613 A1* | 2/2020 | Miller ................ G05D 1/0676 |
| 2020/0062373 A1* | 2/2020 | Liao .................. B64U 10/16 |
| 2020/0094957 A1* | 3/2020 | Sohmshetty .......... B60P 3/11 |
| 2020/0148322 A1* | 5/2020 | Pekrul ............... B63H 5/02 |
| 2020/0165008 A1* | 5/2020 | Krauss ............... B64U 80/25 |
| 2020/0180940 A1* | 6/2020 | Rainville ............ B64F 1/28 |
| 2020/0189731 A1* | 6/2020 | Mistry ............... H04B 7/18502 |
| 2020/0207484 A1* | 7/2020 | Foggia ............... B64U 70/92 |
| 2020/0218287 A1* | 7/2020 | Wang ................. B64U 50/34 |
| 2020/0218288 A1* | 7/2020 | Johnson .............. B64U 30/26 |
| 2020/0225684 A1* | 7/2020 | Anderson ............ B64U 70/95 |
| 2020/0239160 A1* | 7/2020 | Cheng ................ B64F 1/22 |
| 2020/0247540 A1* | 8/2020 | Jones ................. B64D 7/08 |
| 2020/0262583 A1* | 8/2020 | Ducharme ........... B64U 70/97 |
| 2020/0290752 A1* | 9/2020 | Kolosiuk ............ B64U 70/30 |
| 2020/0301445 A1* | 9/2020 | Jourdan .............. G06K 19/06037 |
| 2020/0309489 A1* | 10/2020 | Kadavanich ......... F41J 9/08 |
| 2020/0346736 A1* | 11/2020 | Krasnoff ............. B64U 30/16 |
| 2020/0346743 A1* | 11/2020 | Bernard .............. B64C 25/18 |
| 2020/0349852 A1* | 11/2020 | DiCosola ............ G08G 5/55 |
| 2020/0369408 A1* | 11/2020 | Dolata ................ B60L 53/16 |
| 2020/0398999 A1* | 12/2020 | Ortiz ................. G07C 9/00309 |
| 2020/0406773 A1* | 12/2020 | Lacaze ............... G05D 1/0094 |
| 2021/0031947 A1* | 2/2021 | Wankewycz .......... E04H 6/44 |
| 2021/0045564 A1* | 2/2021 | Duckers .............. E06B 3/483 |
| 2021/0047055 A1* | 2/2021 | Lee ................... B64F 1/36 |
| 2021/0053677 A1* | 2/2021 | Passley .............. B64U 70/95 |
| 2021/0070468 A1* | 3/2021 | Svirsky .............. B64U 80/25 |
| 2021/0086913 A1* | 3/2021 | Friedman ............ B64F 1/362 |
| 2021/0107684 A1* | 4/2021 | Le Lann .............. B60L 53/52 |
| 2021/0122495 A1* | 4/2021 | Rezvani .............. B64F 1/007 |
| 2021/0125503 A1* | 4/2021 | Henry ................ G05D 1/606 |
| 2021/0214102 A1* | 7/2021 | Geng ................. G08G 5/22 |
| 2021/0237694 A1* | 8/2021 | Hirschvogel ......... B60J 7/16 |
| 2021/0237899 A1* | 8/2021 | Warwick ............. B64C 39/024 |
| 2021/0253242 A1* | 8/2021 | Falk-Petersen ....... B64U 80/40 |
| 2021/0276735 A1* | 9/2021 | Raptopoulos ......... A47G 29/141 |
| 2021/0284356 A1* | 9/2021 | Jourdan .............. G08G 5/55 |
| 2021/0300591 A1* | 9/2021 | Tian .................. B64F 1/007 |
| 2021/0354820 A1* | 11/2021 | Hiller ................. B60L 53/12 |
| 2021/0394930 A1* | 12/2021 | O'Toole .............. A47G 29/30 |
| 2022/0019247 A1* | 1/2022 | Dayan ................ B64F 1/222 |
| 2022/0041279 A1* | 2/2022 | Rowse ................ G05D 1/104 |
| 2022/0041299 A1* | 2/2022 | Wankewycz .......... B64U 50/31 |
| 2022/0055745 A1* | 2/2022 | Walker ............... H02G 11/02 |
| 2022/0055770 A1* | 2/2022 | O'Toole .............. B60L 53/80 |
| 2022/0063798 A1* | 3/2022 | Johnson .............. B64C 13/24 |
| 2022/0073214 A1* | 3/2022 | Liske ................. B64F 1/32 |
| 2022/0106125 A1* | 4/2022 | Ragan ................. F16G 3/10 |
| 2022/0119105 A1* | 4/2022 | Schmalzried ......... G05D 1/695 |
| 2022/0169401 A1* | 6/2022 | Di Cosola ............ B64U 70/95 |
| 2022/0171388 A1* | 6/2022 | Yanagihashi .......... B65G 43/00 |
| 2022/0177124 A1* | 6/2022 | Marshall ............. B64U 50/19 |
| 2022/0234757 A1* | 7/2022 | Dayan ................ B64U 80/70 |
| 2022/0242589 A1* | 8/2022 | Pham ................. G09F 27/005 |
| 2022/0380063 A1* | 12/2022 | Shah ................. B64F 1/362 |
| 2022/0396373 A1* | 12/2022 | Wang ................. B60L 53/30 |
| 2023/0017530 A1* | 1/2023 | Lowe ................. B60H 1/00278 |
| 2023/0023246 A1* | 1/2023 | McLaughlin ......... G05D 1/0088 |
| 2023/0031028 A1* | 2/2023 | Ehasoo ............... B64U 80/10 |
| 2023/0044050 A1* | 2/2023 | Cevacins ............ B64U 70/97 |
| 2023/0045483 A1* | 2/2023 | Ahn ................... G05D 1/689 |
| 2023/0045691 A1* | 2/2023 | Cevacins ............ B64U 60/00 |
| 2023/0046127 A1* | 2/2023 | Guerra Johansson .................. G05D 1/0038 |
| 2023/0063715 A1* | 3/2023 | Bell .................. G05D 1/0246 |
| 2023/0088830 A1* | 3/2023 | Kim .................. B64U 50/32 244/221 |
| 2023/0096139 A1* | 3/2023 | Ubaldi ............... B65G 23/44 198/844.1 |
| 2023/0100169 A1* | 3/2023 | Laczak ............... A47G 29/141 232/1 R |
| 2023/0140387 A1* | 5/2023 | Infanti ............... B64C 39/024 244/114 R |
| 2023/0159192 A1* | 5/2023 | Gil .................... B64U 80/40 244/137.1 |
| 2023/0202680 A1* | 6/2023 | Yehya ................ B64U 70/30 244/110 E |
| 2023/0202682 A1* | 6/2023 | Kiyokami ........... B64U 70/90 244/114 R |
| 2023/0202691 A1* | 6/2023 | Kiyokami ........... B64U 80/86 244/114 R |
| 2023/0303272 A1* | 9/2023 | Passley .............. B64U 70/00 |
| 2023/0348106 A1* | 11/2023 | Berthelet ........... B60L 53/302 |
| 2023/0373626 A1* | 11/2023 | Kiyokami ........... B64D 1/22 |
| 2023/0399132 A1* | 12/2023 | Kiyokami ........... B64C 39/024 |
| 2024/0067371 A1* | 2/2024 | Turner ............... B64U 50/37 |
| 2024/0101287 A1* | 3/2024 | Takahashi ........... B64U 80/86 |
| 2024/0109656 A1* | 4/2024 | Stege ................. G06Q 10/083 |
| 2024/0132238 A1* | 4/2024 | Qiu ................... B64U 70/92 |
| 2024/0140630 A1* | 5/2024 | Lee ................... B64U 80/40 |
| 2024/0158112 A1* | 5/2024 | Le Lann ............ H01M 50/262 |
| 2024/0278946 A1* | 8/2024 | Roberts .............. B64U 10/16 |
| 2024/0336378 A1* | 10/2024 | Neate ................. B64U 70/50 |
| 2024/0391616 A1* | 11/2024 | Dayan ................ B64U 70/90 |
| 2025/0002185 A1* | 1/2025 | Liu .................... B64U 80/70 |
| 2025/0026509 A1* | 1/2025 | Infanti ............... B64U 70/50 |
| 2025/0121966 A1* | 4/2025 | Gronstedt ........... B64U 80/10 |
| 2025/0145314 A1* | 5/2025 | Gronstedt ........... B64F 1/322 |

FOREIGN PATENT DOCUMENTS

| | | |
|---|---|---|
| CN | 108945502 B | 6/2020 |
| CN | 111483386 A | 8/2020 |
| CN | 111691730 A | 9/2020 |
| CN | 111731499 A | 10/2020 |
| CN | 111776237 A | 10/2020 |
| CN | 212313860 U | 1/2021 |
| CN | 113002798 A | 6/2021 |
| CN | 113479337 A | 10/2021 |
| WO | 2018/201277 A1 | 11/2018 |
| WO | 2021082794 A1 | 5/2021 |

* cited by examiner

UNMANNED AERIAL VEHICLE BASE STATION AND UNMANNED AERIAL VEHICLE SYSTEM

CROSS-REFERENCE TO RELATED APPLICATION

The present application is a continuation of International Application No. PCT/CN2022/079906, filed Mar. 9, 2022, the entire content of which being incorporated herein by reference in its entirety.

TECHNICAL FIELD

Some embodiments of the present disclosure relate to the technical field of unmanned aerial vehicle (UAV), and in particular, to an unmanned aerial vehicle base station and an unmanned aerial vehicle system.

BACKGROUND

With the continuous rapid development of science and technology and UAV technology, UAVs have been widely used in many fields. Due to the limitation of the battery life of UAVs, UAVs cannot stay in the air for a long time to perform tasks. Therefore, a kind of UAV base station is usually designed on the ground. The main functions of the UAV base station can be used to charge the UAV, increase the UAV range, etc. In addition, the UAV base station can communicate with the UAV and can be used to control the takeoff and landing of the UAV.

However, existing UAV base stations are typically larger in size and less space efficient.

SUMMARY

Embodiments of the present disclosure provide an aerial vehicle base station and an aerial vehicle system that can realize product miniaturization and reduce product cost and footprint.

According to an aspect of embodiments of the present disclosure, there is provided a base station. The base station comprises a base body, a landing pad provided on the base body, and a base station opening and closing structure movably provided on the base body. The base station opening and closing structure may include an open state and a closed state. In the open state, the base station opening and closing structure may provide a landing space for an aerial vehicle to land on the landing pad, and in the closed state, the base station opening and closing structure may provide an accommodating space to accommodate the aerial vehicle. During a process of the base station opening and closing structure transitioning from the open state to the closed state, the base station opening and closing structure may be configured to propel some blades of the aerial vehicle partially protruding out of the accommodating space to fold or retract so as to accommodate the aerial vehicle within the accommodating space.

According to another aspect of the present disclosure, a system is provided. The system comprises an aerial vehicle; and a base station. The base station comprises a base body; a landing pad, provided on the base body; and a base station opening and closing structure movably disposed on the base body, the base station opening and closing structure comprising an open state and a closed state, wherein in the open state, the base station opening and closing structure provides a landing space for an aerial vehicle to land on the landing pad, and in the closed state, the base station opening and closing structure provides an accommodating space to accommodate the aerial vehicle, and during a process of the base station opening and closing structure transitioning from the open state to the closed state, the base station opening and closing structure is configured to propel some blades of the aerial vehicle partially protruding out of the accommodating space to fold or retract so as to accommodate the aerial vehicle within the accommodating space.

It should be understood that the above general description and the detailed description that follows are exemplary and explanatory only and do not limit the present application.

BRIEF DESCRIPTION OF THE DRAWINGS

In order to explain the technical features of embodiments of the present disclosure more clearly, the drawings used in the present disclosure are briefly introduced as follow. Obviously, the drawings in the following description are some exemplary embodiments of the present disclosure. Ordinary person skilled in the art may obtain other drawings and features based on these disclosed drawings without inventive efforts.

DETAILED DESCRIPTION

The technical solutions in the embodiments of the present disclosure will be clearly and completely described below in conjunction with the accompanying drawings in the embodiments of the present disclosure, and it is clear that the described embodiments are only a part of the embodiments of the present disclosure and not all of the embodiments. Based on the embodiments in the present disclosure, all other embodiments obtained by a person of ordinary skill in the art without making creative labor fall within the scope of protection of the present disclosure.

Exemplary embodiments will be described herein in detail, examples of which are represented in the accompanying drawings. When the following description relates to the accompanying drawings, the same numerals in the different accompanying drawings indicate the same or similar elements unless otherwise indicated. The embodiments described in the following exemplary embodiments do not represent all embodiments consistent with the present disclosure. Rather, they are only examples of devices and methods consistent with some aspects of the present disclosure as detailed in the appended claims.

The terminology used in the present disclosure is for the sole purpose of describing particular embodiments and is not intended to limit the disclosure. The singular forms of "a" "an," and "the" as used in the present disclosure and appended claims are also intended to encompass the plurality form, unless the context clearly indicates otherwise. It should also be understood that the term "and/or" as used herein refers to and encompasses any or all possible combinations of one or more of the listed items in association. Unless otherwise noted, the terms "front," "rear," "lower," and/or "upper" and similar terms are used for convenience only and are not intended to be limited to a location or a spatial orientation. Words such as "connected" or "coupled" are not limited to physical or mechanical connections, but may include electrical connections, whether direct or indirect. "Capable" in the context of the present disclosure may denote the ability to.

Various embodiments of the present disclosure are described in detail below in conjunction with the accompanying drawings. The features in the following embodiments and embodiments may be combined with each other without conflict.

Figure 1:
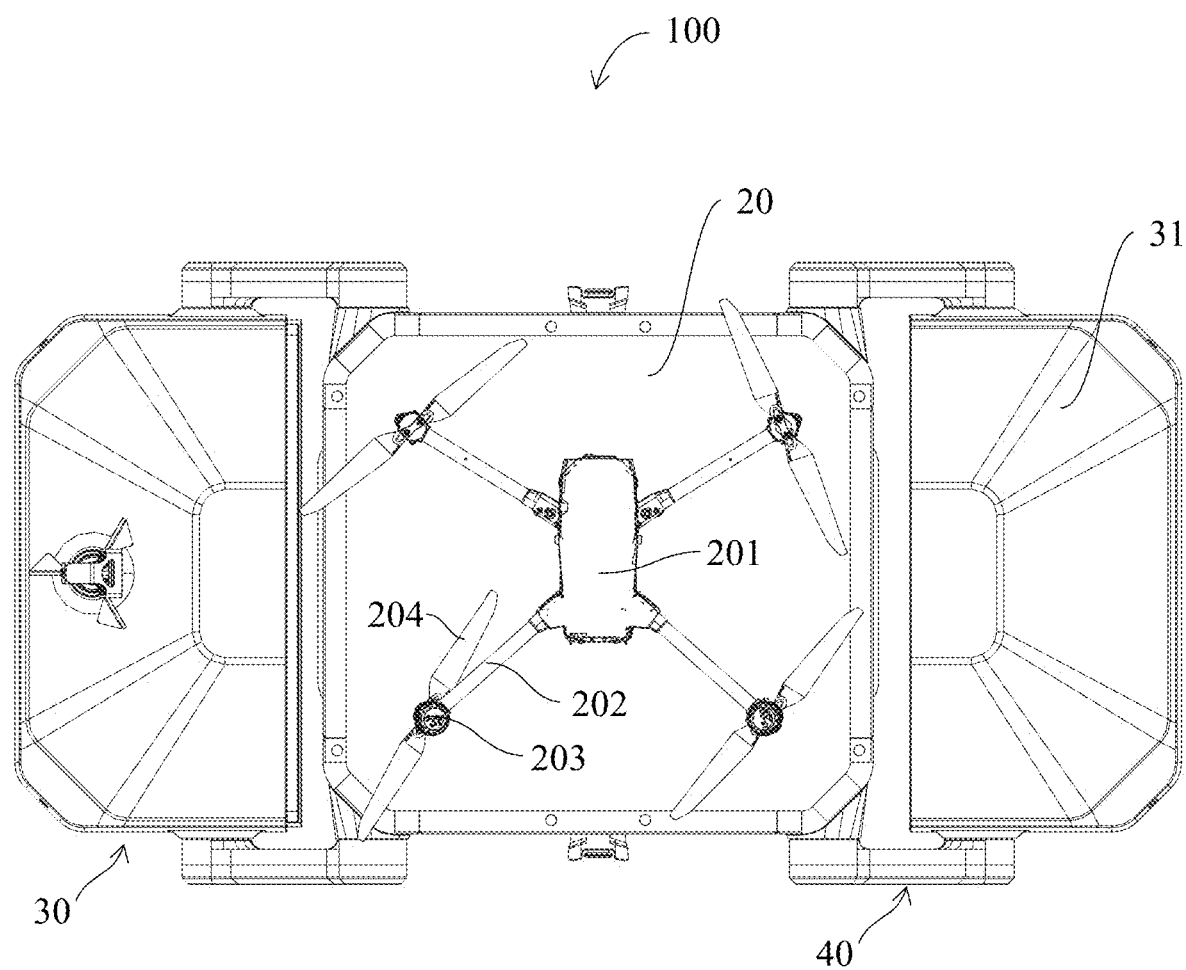
FIG. 1 shows a top view of a UAV base station in an open state according to one embodiment of the present disclosure.
Figure 2:
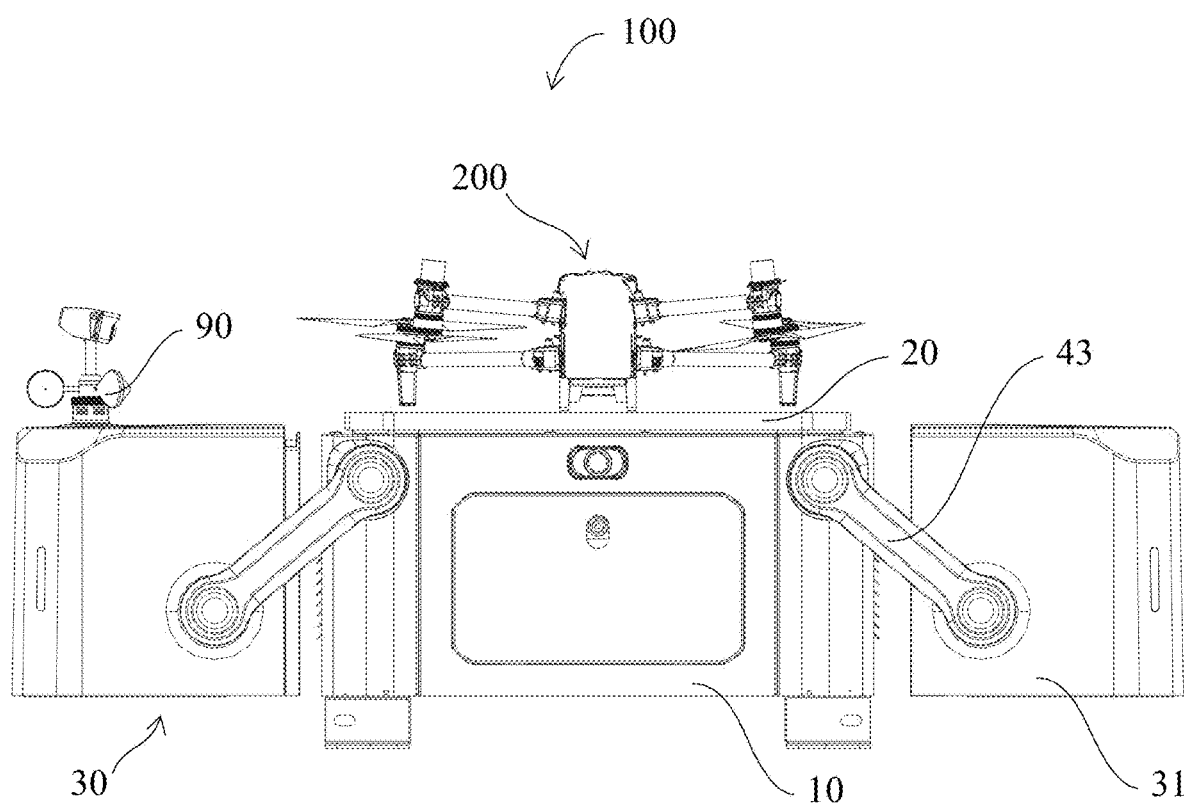
FIG. 2 shows a side view of a UAV base station in an open state according to one embodiment of the present disclosure.
Figure 3:
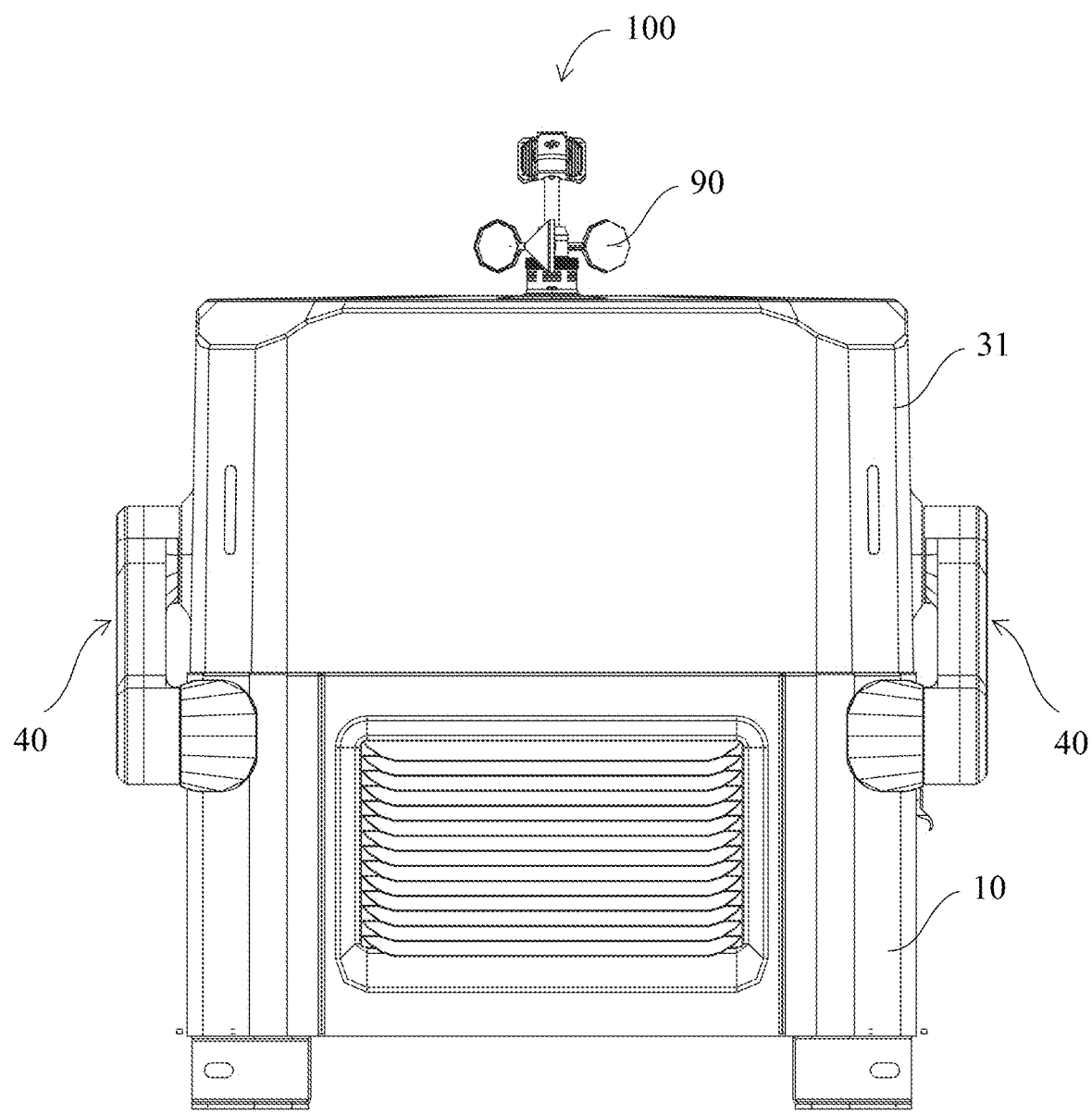
FIG. 3 shows a side view of a UAV base station in a closed state according to one embodiment of the present disclosure.
Figure 4:
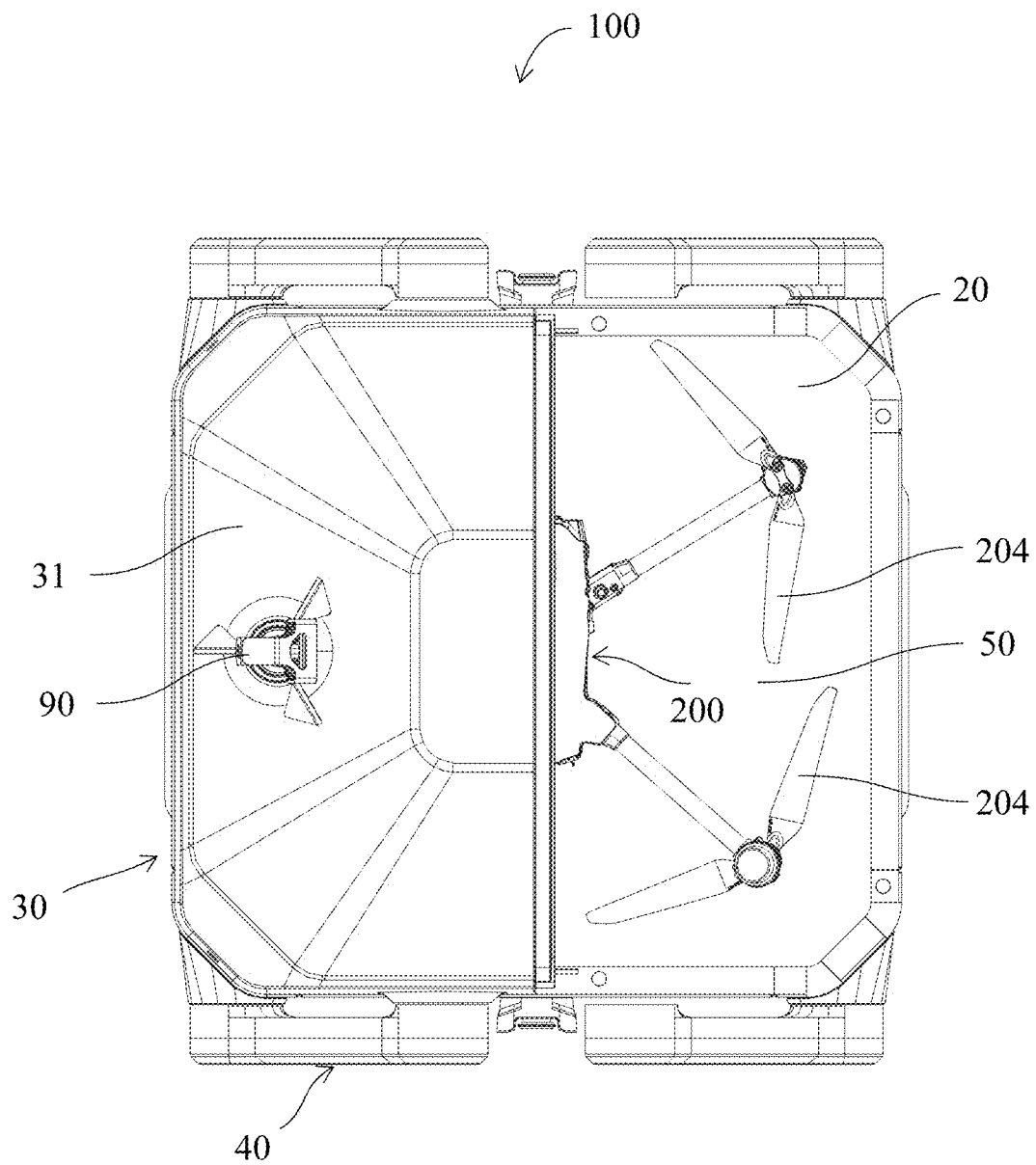
FIG. 4 shows a top view of a UAV base station in a closed state, wherein the protective cover on one side is removed, according to one embodiment of the present disclosure.
Figure 5:
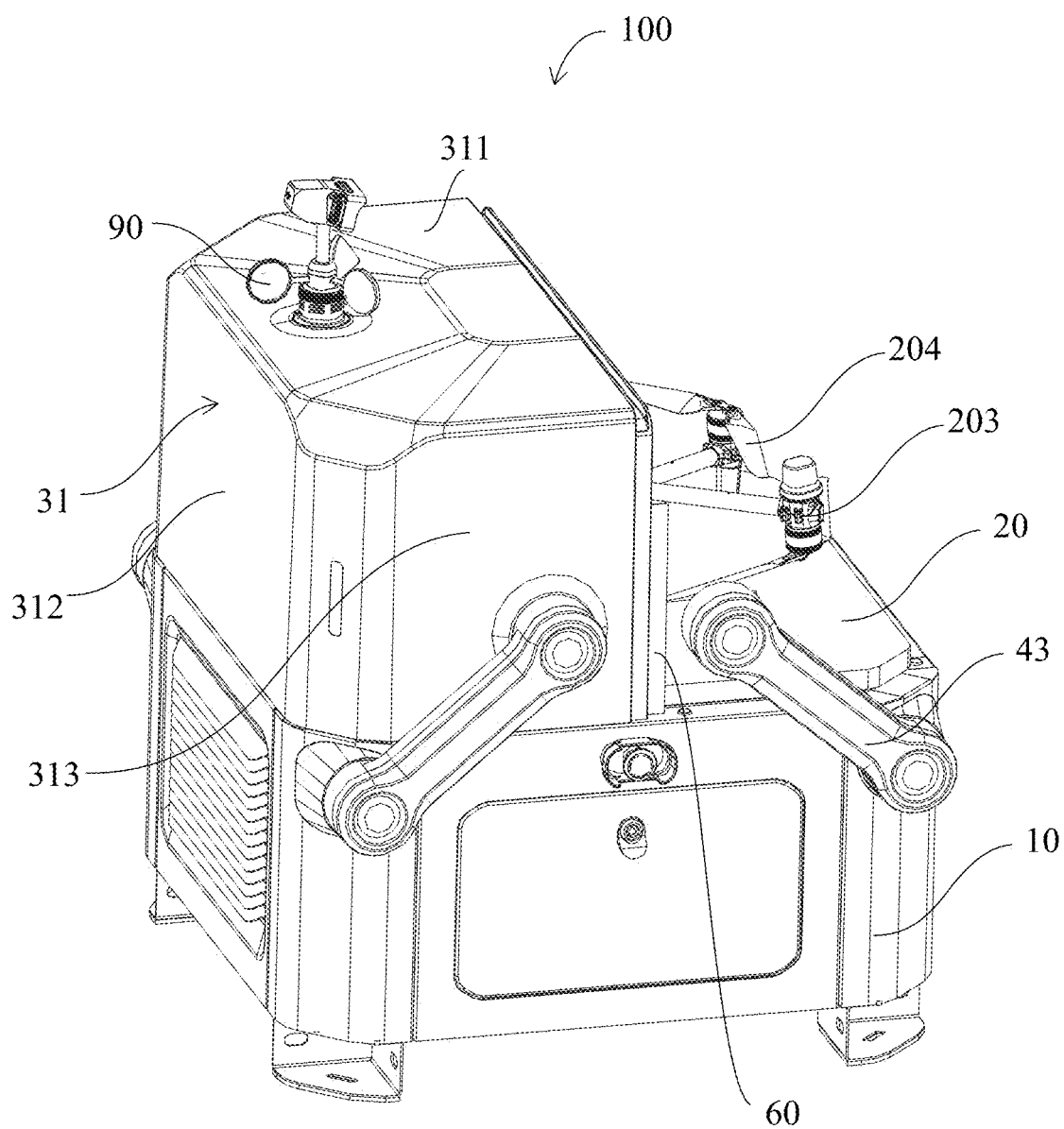
FIG. 5 shows a three-dimensional view of a UAV base station in a closed state, wherein the protective cover on one side is removed, according to one embodiment of the present disclosure.

One embodiment of the present disclosure provides a UAV base station 100. FIGS. 1 and 2 reveal a top view and a side view, respectively, of the UAV base station 100 in an open state of an embodiment of the present disclosure; and FIGS. 3 to 5 reveal a side view, a top view, and a three-dimensional view, respectively, of the UAV base station 100 in a closed state of an embodiment of the present disclosure. In FIGS. 4 and 5, in order to show more clearly the state in which the blades are folded in the accommodating space, the protective cover on one side is removed. As shown in FIGS. 1 to 5, the UAV base station 100 of one embodiment of the present disclosure includes a base body 10, a landing pad 20 disposed on the base body 10, and a base station opening and closing mechanism or structure 30 movably disposed on the base body 10.

The base station opening and closing mechanism 30 includes an open state and a closed state. As shown in FIGS. 1 and 2, when the base station opening and closing mechanism 30 is in the open state, the landing pad 20 is fully exposed and the UAV 200 may land on the landing pad 20. As shown in FIGS. 3 through 5, when the base station opening and closing mechanism 30 is in the closed state, an accommodating space 50 that can be used to hold the UAV 200 is formed between the base station opening and closing mechanism 30 and the landing pad 20, and the base station opening and closing mechanism 30 covers the landing pad 20 completely, and the landing pad 20 is fully contained within the accommodating space 50.

The UAV 200 includes foldable blades 204. and, when the UAV 200 lands on the landing pad 20, the blades of the UAV 200 at least partially protrude outside of the accommodating space 50. In some embodiments, after the UAV 200 lands on the landing pad 20, the base station opening and closing mechanism 30 of an embodiment of the present disclosure may actuate the blades 204 to fold within the accommodating space 50 so that the UAV 200 is housed within the accommodating space 50.

The UAV base station 100 of the embodiment of the present disclosure can automatically drive the base station opening and closing mechanism 30 to fold the blades 204 in the accommodating space 50 during the process of closing the base station opening and closing mechanism 30 after the UAV 200 lands on the landing pad 20, thereby holding the UAV 200 as a whole in the accommodating space 50. Thus, the area enclosed by the boundary of the accommodating space 50 formed between the base station opening and closing mechanism 30 and the landing pad 20 during the closed state of the base station opening and closing mechanism 30 can be greatly reduced relative to the projected area of the entire envelope of the UAV 200 as it is in the flight state. The area enclosed by the boundary of the accommodating space 50 as described herein refers to the area formed by the projection of the accommodating space 50 on a plane in which the landing pad 20 is located.

Therefore, the size of the UAV base station 100 of the embodiment of the disclosure can be greatly reduced relative to the existing UAV base station 100 designed with the projected area of the entire envelope, thereby enabling miniaturization of the product and reduction of the product cost and footprint.

As shown in FIG. 1, in some embodiments of the present disclosure, the UAV 200 comprises a fuselage 201, an arm 202 disposed on the fuselage 201, and a blade drive motor or first driving structure 203 disposed at an end of the arm 202 for driving the blades 204 to rotate. In one embodiment, a pair of blades 204 is disposed at an end of the arm 202, and the blade drive motor 203 can simultaneously drive the pair of blades 204 to rotate. Of course, in other embodiments, only one blade 204 may be provided at the end of the arm 202, and the blade drive motor 203 may drive the one blade 204 to rotate.

Thus, in some embodiments, the area enclosed by the boundary of the accommodating space 50 of the UAV base station 100 may be determined based on the projected area of the blade drive motors 203 on the plane in which the landing pad 20 is located. The area enclosed by the boundary of the accommodating space 50 is typically larger than the projected area of the blade drive motors 203 on the plane in which the landing pad 20 is located.

The UAV base station 100 of the embodiment of the present disclosure is capable of designing the size of the base station based on the projected area of the blades 204 of the UAV 200 on the plane where the landing pad 20 is located, and collapsing the blades 204 in the accommodating space 50 by changing the direction or the shape of the blades 204 or the like, so that the problem of the UAV base station 100 being oversized due to the size of the blades 204 can be avoided, and miniaturization of the base station can be realized.

In some embodiments, considering that the UAV 200 may not land accurately on the landing pad 20 of the UAV base station 100 during actual landing, the area enclosed by the boundary of the accommodating space 50 of the UAV base station 100 may be determined based on a combination of a projected area of the blade drive motors 203 on the plane where the landing pad 20 is located and the landing accuracy of the UAV 200. If the landing accuracy of the UAV 200 can be made higher, the size of the UAV base station 100 will be able to be made smaller.

With continued reference to FIG. 1, it is shown that, in one embodiment, the UAV 200 may include four arms 202, with two arms 202 provided on each of the opposite sides of the fuselage 201. A blade drive motor 203 and a blade 204 are provided at the end of each arm 202, respectively. Each blade drive motor 203 may, for example, drive a pair of blades 204 to rotate, respectively. Thus, in this case, the boundary extent of the accommodating space 50 of the UAV base station 100 may be determined based on the dimensions of a rectangle enclosed by the four blade drive motors 203. Thus, the UAV base station 100 of the embodiment of the present disclosure can greatly reduce the size of the base station relative to existing UAV base stations designed with a complete projected envelope area of the entire UAV 200 including the blades 204.

As shown in FIGS. 4 and 5, in some embodiments, the blades 204 of the UAV 200 housed in the accommodating space 50 are in a stationary and retracted state while the base station opening and closing mechanism 30 is in a closed state. In one embodiment, the retracted state described herein may be that the blades 204 are in a fully folded state. Of course, in other embodiments, the retracted state described herein does not necessarily require the blades 204 to be in a fully folded state, and the retracted state described herein may also be that the blades 204 are moved and folded relative to the fully unfolded state of the blades. For example, when the base station opening and closing mechanism 30 is in the closed state, it is sufficient to make the blades 204 fold into the rectangle enclosed by the four blade drive motors 203. Thereby, the projected area of the UAV 200 on the plane where the landing pad 20 is located can be reduced, which in turn can reduce the boundary dimensions of the accommodating space 50 of the UAV base station 100.

Figure 6:
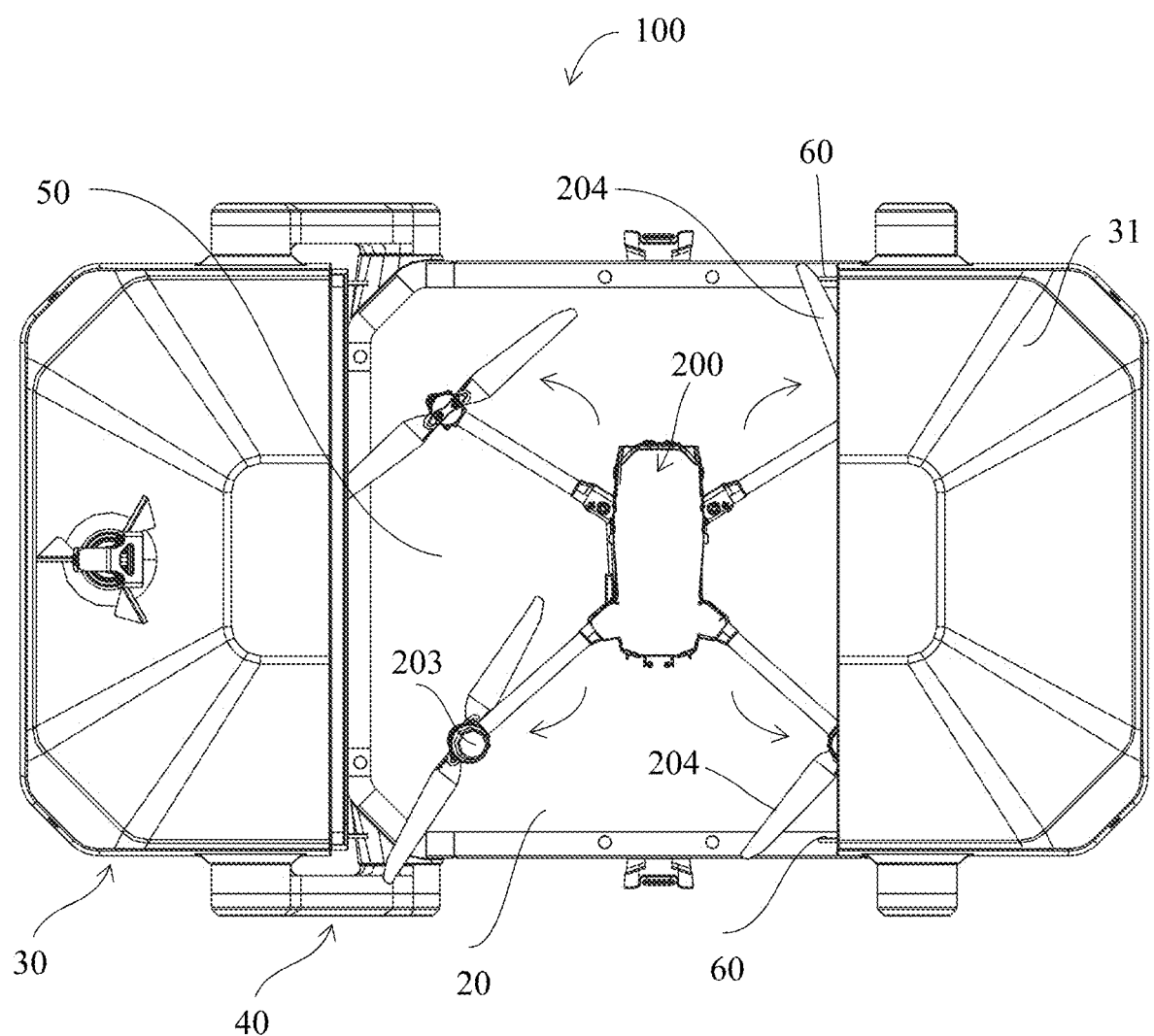
FIG. 6 shows a top view of a UAV base station in an intermediate state according to one embodiment of the present disclosure.
Figure 7:
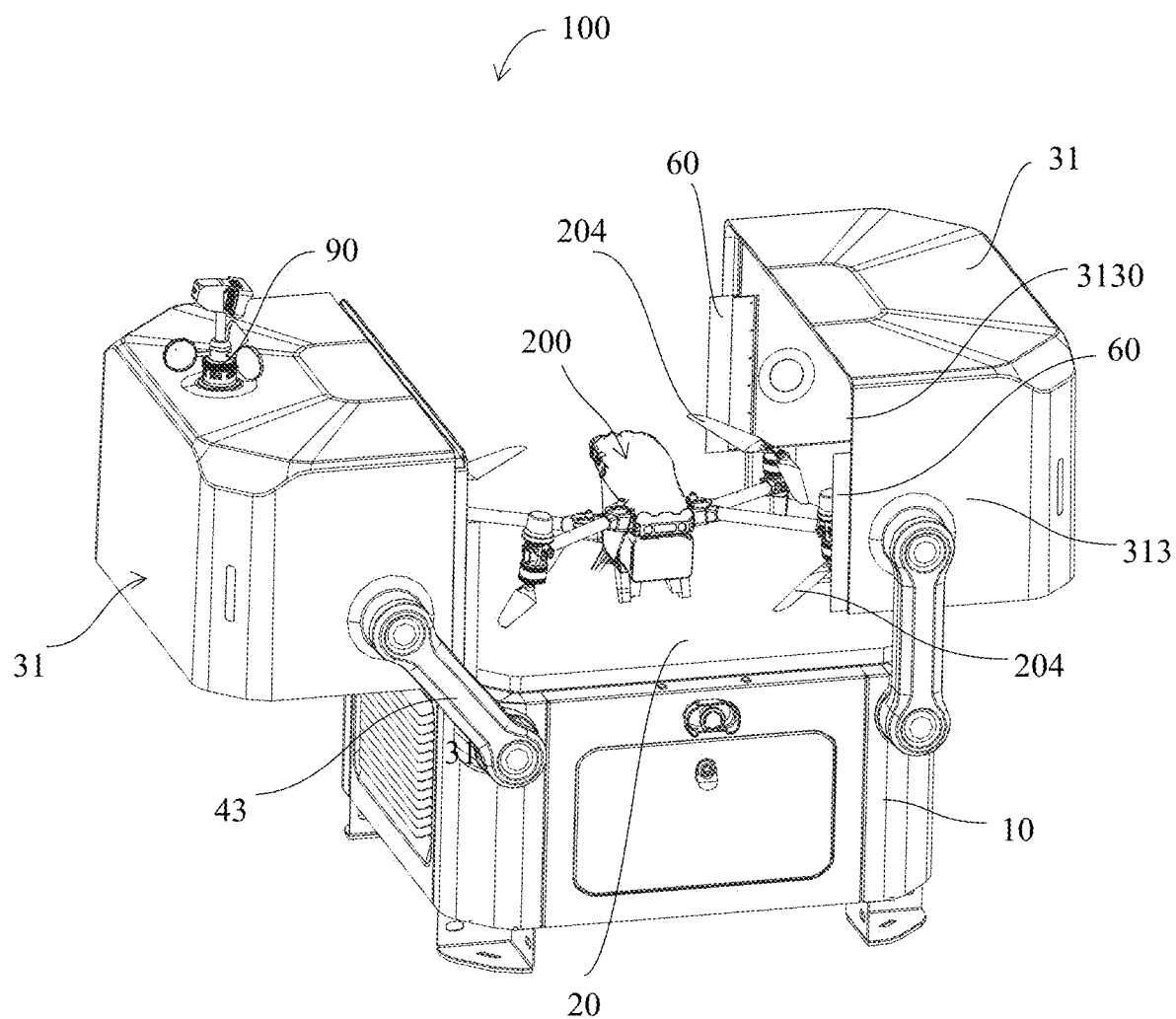
FIG. 7 shows a three-dimensional view of a UAV base station in an intermediate state according to one embodiment of the present disclosure.

The following will describe in detail, in conjunction with FIGS. 6 and 7, how the process of closing the cover of the base station opening and closing mechanism 30 of the UAV base station 100 is accomplished to allow the blades 204 of the UAV 200 to retract after the UAV 200 has landed on the landing pad 20.

FIGS. 6 and 7 reveal a three-dimensional schematic view of the UAV base station 100 of one embodiment of the present disclosure when it is in an intermediate state. As shown in FIGS. 6 and 7, the base station opening and closing mechanism 30 also has an intermediate state that is located between the open state and the closed state. During the process of closing the cover of the base station opening and closing mechanism 30, when the base station opening and closing mechanism 30 closes the cover from the open state to the intermediate state, the base station opening and closing mechanism 30 may touch the blade 204 and may push the blade 204 to gradually carry out the retracting. Thereby, when the base station opening and closing mechanism 30 completely closes the cover in the closed state, the blades 204 of the UAV 200 are in the retracted state as shown in FIG. 3.

The UAV base station 100 of this embodiment of the disclosure further comprises a control system (not shown).

In order for the base station opening and closing mechanism 30 to always be able to touch the blades 204 of the UAV 200 during the process of closing the cover, therefore, in some embodiments, when the UAV 200 lands on the landing pad 20 and the base station opening and closing mechanism 30 performs the closing of the cover, the control system of the UAV base station 100 may control the blades 204 of the UAV 200 to rotate at a low speed, that is, at a first speed, and control the base station opening and closing mechanism 30 to slowly close the cover at a second speed. In one embodiment, the first speed of the blades 204 is greater than the second speed of the base station opening and closing mechanism 30. Thereby, when the base station opening and closing mechanism 30 closes the cover to an intermediate state, the base station opening and closing mechanism 30 can just touch the blades 204 and push the blades 204 to retract.

As shown in FIG. 6, the control system may control the blades 204 to rotate toward the cover of the base station opening and closing mechanism 30 when the base station opening and closing mechanism 30 is closing the cover. The control system drives the blades 204 to rotate towards the direction of the closing cover of the base station opening and closing mechanism 30 by controlling the blade drive motors 203 on each of the arms 202. For example, the rotational direction of the blades 204 on the four arms 202 is shown as the direction of the arrows in FIG. 6.

In some embodiments, the base station opening and closing mechanism 30 may include a pair of protective covers 31, the pair of protective covers 31 being disposed symmetrically on opposite sides of the base body 10.

In one embodiment, each protective cover 31 is substantially in the form of a rectangular frame, the protective cover 31 having a top wall 311, a first sidewall 312, and two opposing second sidewalls 313, the two second sidewalls 313 being attached to opposite sides of the first sidewall 312, and the top wall 311 being attached to the first sidewall 312 and to the two opposing second sidewalls 313, respectively, to thereby enclose a rectangular frame.

In the process of closing the cover of the base station opening and closing mechanism 30, the two protective covers 31 respectively move relative to each other from the open state towards the closed state, and gradually approach each other. When the two protective covers 31 contact each other, the two protective covers 31 completely close the cover and are in the closed state. In the process of opening the cover of the base station opening and closing mechanism 30, the two protective covers 31 respectively move relative to each other from the closed state toward the open state, and move away from each other.

As shown in FIGS. 6 and 7, when the base station opening and closing mechanism 30 is closed to an intermediate state, an end side surface 3130 of at least one of the two second sidewalls 313 of the protective cover 31 touches the blade 204 and pushes the blade 204 to retract.

In the process of contacting between the protective cover 31 and the blade 204, a line may be formed between the motor shaft of the blade drive motor 203 of the UAV 200, the blade 204 and the point at which the second side wall 313 of the protective cover 31 comes into contact with the blade 204, which causes the line of action of the propelling force given by the second side wall 313 of the protective cover 31 to pass through the motor shaft of the blade drive motor 203. Since an initial phase angle of the blade 204 is not restricted, at this time, the propelling force does not play the role of propelling the blade, but gives an additional push to the entire UAV. If the protective cover 31 is continued to be driven to close at this time, there is a possibility of damaging the blades 204 or other components of the UAV 200, a situation that is commonly referred to as reaching a dead point of the motion in the mechanics of motion. Therefore, in order to prevent the protective cover 31 and the blades 204 from reaching a kinematic dead point during the process of the protective cover 31 touching the blades 204, as shown in FIGS. 6 and 7, in some embodiments, a flexible device 60 may be provided at the end side surface of each second sidewall 313 of the protective cover 31, which may be utilized to change the direction of the propelling force, which may be utilized to solve the problem of kinematic dead point.

Figure 8:
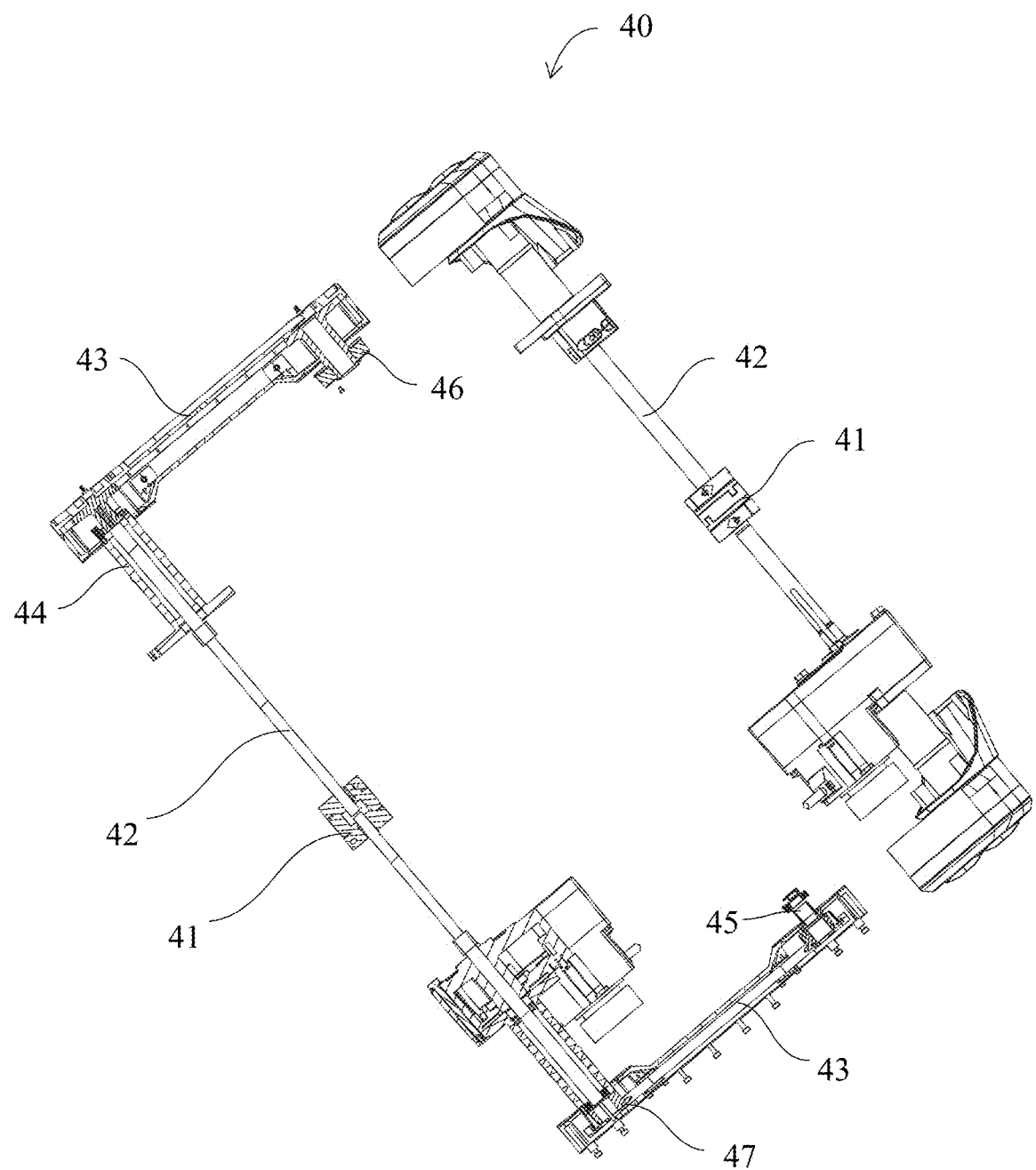
FIG. 8 shows a simplified structural schematic diagram of a translational drive mechanism according to one embodiment of the present disclosure.

As shown in FIG. 8, the UAV base station 100 of the embodiment of the present disclosure further comprises a drive mechanism, the drive mechanism comprising a drive motor 41 for driving the movement of the protective cover 31. In other embodiments, the control system may also determine whether the dead point of the movement is reached by detecting the torque of the drive motor 41, and the control system may control the drive motor 41 to rotate positively or reversely. In one embodiment, the control system may detect the magnitude of the torque of the drive motor 41 by the magnitude of the current value fed back by the drive motor 41. If it appears that the current value fed back by the drive motor 41 is abnormally high, such as the current value fed back by the drive motor 41 is higher than a predetermined current value, when the second sidewall 313 of the protective cover 31 touches the blade 204, it can be determined that the protective cover 31 and the blade 204 have reached a dead point of movement in this case. Therefore, at this time, the control system may control the drive motor 41 to first reverse and then forward, so that the movement dead point can be avoided.

In other embodiments, the control system may also detect a real-time position of the blade 204 and the protective cover 31, and may control at least one of a rotational speed of the blade 204 or a closing speed of the protective cover 31 based on the real-time position of the blade 204 and the protective cover 31, so as to avoid the protective cover 31 and the blade 204 from reaching a dead point at the same time.

As shown in FIG. 2, a top surface of the protective cover 31 may not be higher than the landing pad 20 in order to prevent that the blades 204 of the UAV 200 may touch the protective cover 31 when the UAV 200 lands on the landing pad 20 when the base station opening and closing mechanism 30 is in the open state.

In some embodiments, the drive mechanism or structure for driving the opening and closing motion of the base station opening and closing mechanism 30 of an embodiment of the present disclosure comprises a pair of translational drive mechanisms or structures 40. FIG. 8 reveals a schematic diagram of the translational drive mechanisms 40 of an embodiment of the present disclosure. As shown in FIG. 8, each translational drive mechanism 40 is provided between a side of the base body 10 and a protective cover 31, and can be used to drive the protective cover 31 to translate relative to the base body 10.

In some embodiments, each translational drive mechanism 40 includes a drive motor 41, a motor drive shaft 42, and a pair of rocker arms 43. The motor drive shaft 42 is provided on one side of the base body 10, and both ends of the motor drive shaft 42 are respectively fixed to the base body 10 via bearings 44. The pair of rocker arms 43 are respectively provided on opposite sides of the protective cover 31, and one end of each rocker arm 43 is fixedly connected to one end of the motor drive shaft 42, and the other end is movably connected to the protective cover 31. The translational drive mechanism 40 further includes a protective cover follower shaft 45. The protective cover follower shaft 45 is movably disposed on the protective cover 31, for example, the protective cover follower shaft 45 may be fixed to the protective cover 31 by means of a bearing 46. When the rocker arm 43 swings, the protective cover 31 can rotate freely around the protective cover follower shaft 45. Therein, the other end of the rocker arm 43 is fixedly connected to the protective cover follower shaft 45, thereby, realizing a movable connection between the rocker arm 43 and the protective cover 31. In one embodiment, both ends of the rocker arm 43 are fixedly connected to the motor drive shaft 42 and the protective cover follower shaft 45, respectively, by means of flange bolt 47 connections.

Wherein, the drive motor 41 on each side of the base body 10 can drive the pair of rocker arms 43 to swing by rotating the drive motor drive shaft 42, thereby driving the protective cover 31 on that side to move.

In some embodiments, the translational drive mechanism 40 may maintain an attitude of the top wall 311 of the protective cover 31 facing upward at all times during the opening and closing of the protective cover 31. The translational drive mechanism 40 also includes an attitude retention mechanism, and the attitude retention mechanism may be used to maintain the attitude of the protective cover 31.

Figure 9:
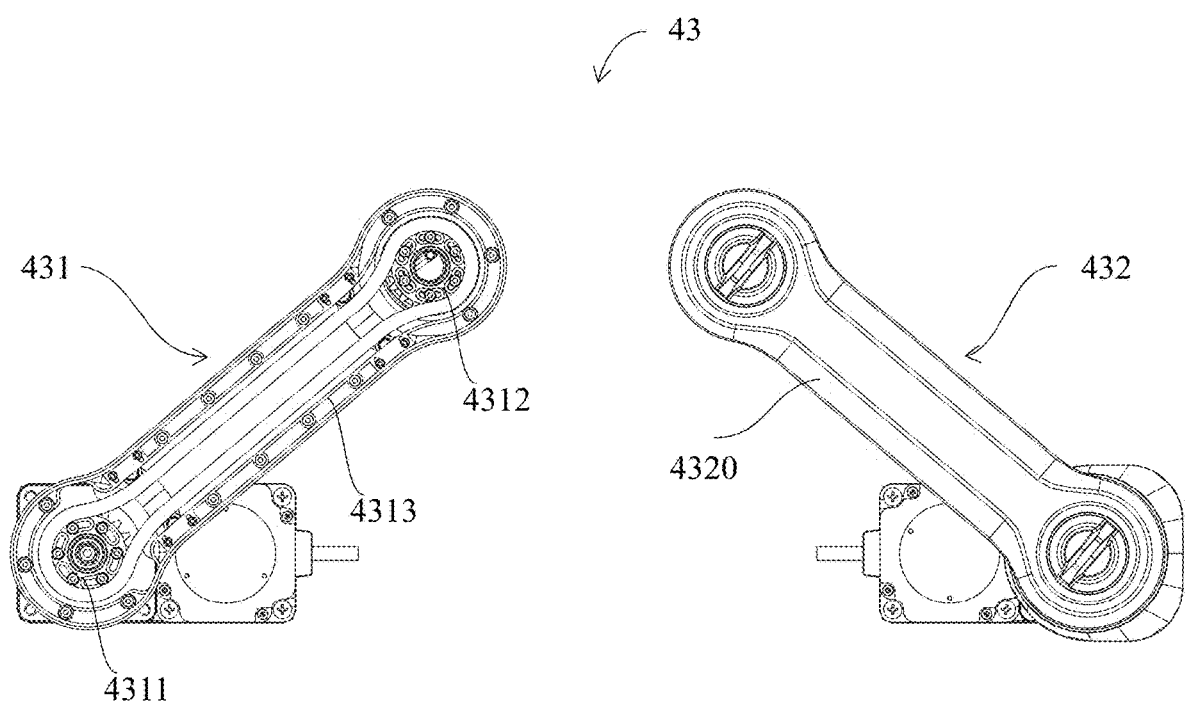
FIG. 9 shows a simplified structural schematic diagram of an active side rocker arm and a passive side rocker arm according to one embodiment of the present disclosure.

A pair of rocker arms 43 of an embodiment of the present disclosure comprises an active side rocker arm 431 and a passive side rocker arm 432. FIG. 9 reveals a simplified structural schematic diagram of the active side rocker arm 431 and the passive side rocker arm 432 of an embodiment of the present disclosure. As shown in FIG. 9, the attitude retention mechanism may be provided in the active side rocker arm 431, while the attitude retention mechanism may not be provided in the passive side rocker arm 432. Since the protective cover 31 is usually made of a rigid material, the attitude retention mechanism provided in the active side rocker arm 431 will give a holding force to the second side wall 313 of the protective cover 31 located on the side of the active side rocker arm 431 while also giving a holding force to the second side wall 313 of the protective cover 31 located on the side of the passive side rocker arm 432. The second side wall 313 of the protective cover 31 on the side of the passive side rocker arm 432 is given a holding force, so that the protective cover 31 always maintains a posture of the top wall 311 of the protective cover 31 facing upward during opening and closing.

In some embodiments, the attitude retention mechanism includes a first sprocket 4311, a second sprocket 4312, and a chain 4313. The first sprocket 4311 is secured to the base body 10, and the second sprocket 4312 is secured to the protective cover 31. The first sprocket 4311 and the second sprocket 4312 are connected in tension by the chain 4313. The first sprocket 4311 and the second sprocket 4312 are respectively co-centered with the ends of the rocker arm 43.

When the drive motor 41 on each side can drive the rocker arm 43 to rotate via the motor drive shaft 42, the second sprocket 4312 can rotate with the rocker arm 43 around the first sprocket 4311, and because of the chain 4313, the second sprocket 4312 can be kept in the same phase with the first sprocket 4311, which can make it possible for the protective cover 31 to keep the attitude consistently the same in the process of opening and closing.

The translational drive mechanism 40 of the embodiment of the present disclosure can realize a large angle swing of the rocker arm 43, which can make the space above the landing plane of the UAV 200 clear, avoiding the interference of external factors causing the UAV 200 to collide.

FIG. 9 reveals a schematic view of a structure of the passive side rocker arm 432 of one embodiment of the present disclosure. As shown in FIG. 9, since the attitude retention mechanism formed by the first sprocket 4311, the second sprocket 4312, and the chain 4313 is not provided in the passive side rocker arm 432, in some embodiments, the alignments of the electronic components used for the protective cover 31 can be arranged in the internal cavity 4320 of the passive side rocker arm 432. Thus, the internal space of the protective cover 31 can be saved, the utilization of the space is high, the electronic components for the protective cover 31 can be integrated in the top layout of the product, the product deployment is more convenient, and the product integration is high.

Electronic components such as antennas, cameras, etc. can be arranged on top of the protective cover 31.

In some embodiments, at least one of an environmental monitoring device such as a rain gauge, an anemometer, a wind gauge, a temperature sensor, a humidity sensor, and the like may be arranged on the top of the protective cover 31. In other embodiments, the UAV base station 100 may also include a weather station 90 that centralizes the functions of the multiple environmental monitoring devices in a single station, and the weather station 90 may be directly on top of the protective cover 31.

Considering that when the UAV base station 100 is deployed in a cold, rainy, or snowy region, the protective cover 31 of the UAV base station 100 may be susceptible to being frozen by snow and ice and thus unable to be opened and closed, an ice-melting device may be designed around the protective cover 31 of the UAV base station 100, so that unattended deployment can be realized globally. In some embodiments, the UAV base station 100 of an embodiment of the present disclosure may further comprise a heating member 70, wherein the heating member 70 may be used to heat the seams of the pair of protective covers 31.

Figure 10:
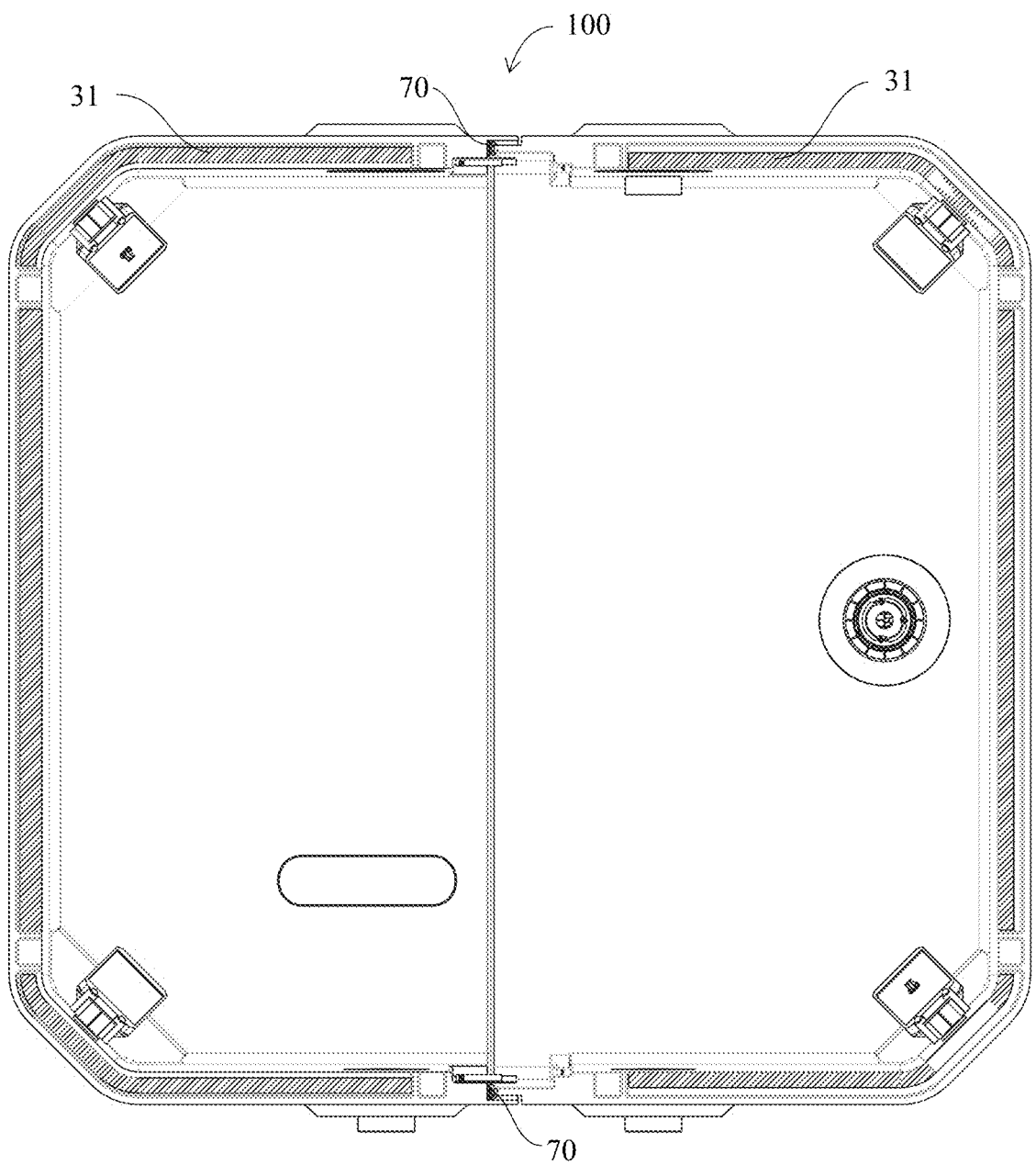
FIG. 10 shows a schematic diagram of an embodiment of the present disclosure in which a heating member is provided on a protective cover.

FIG. 10 reveals a schematic diagram of an embodiment of the present disclosure in which a heating member 70 is provided on a protective cover 31. As shown in FIG. 10, the top wall 311 of one of the pair of protective covers 31 is provided with a convex bar (not labeled) extending outwardly, and a corresponding groove (not labeled) is provided at the lower end of the top wall 311 of the other protective cover 31, and the convex bar is mated with the groove, and the heating member 70 is provided in the convex bar.

When the pair of protective covers 31 is in a closed state with the cover completely closed, the heating member 70 is disposed at the seam of the pair of protective covers 31 and can heat the seam of the pair of protective covers 31.

The heating member 70 is communicatively coupled to a control system, which can be used to control the heating member 70. In some embodiments, the control system can be used to control the heating member 70 based on the weather station 90 or based on the outdoor temperature read by the temperature sensor. When the control system determines that the protective cover 31 is frozen with snow and ice based on the weather station 90 or based on the outdoor temperature read by the temperature sensor, the control system may control to turn on the heating member 70, so that the snow and ice at the crevices of the protective cover 31 can be heated and melted so that the protective cover 31 can be opened smoothly to adapt to global unattended deployment. Of course, in other embodiments, the protective cover 31 of the UAV base station 100 may also be manually observed via a camera to see if the protective cover 31 is frozen with ice. When the protective cover 31 of the UAV base station 100 is observed to be iced over and frozen, the heating member 70 may be manually turned on to heat and melt the snow and ice at the seams of the protective cover 31.

Embodiments of the present disclosure also provide a UAV system. The UAV system comprises a UAV 200 and a UAV base station 100 as described in the above embodiments.

The UAV system of the embodiments of the present disclosure has beneficial technical effects that are substantially similar to those of the UAV base station 100 described in the various embodiments above, and, therefore, will not be repeated herein.

It should be noted that, in this document, relational terms such as "first" and "second" are used only to distinguish one entity or operation from another, and do not necessarily require or imply the existence of any such actual relationship or order between those entities or operations. The terms "including", "comprising", or any other variant thereof, are intended to cover non-exclusive inclusion, such that a process, method, article or apparatus comprising a set of elements includes not only those elements, but also other elements not expressly listed. Or it also includes elements that are inherent to such process, method, article or apparatus. Without further limitation, the fact that an element is defined by the phrase "includes a . . . " does not preclude the existence of another identical element in the process, method, article or apparatus that includes the element.

The UAV base station and UAV system provided by the embodiments of the present disclosure are described in detail above, and specific examples are applied herein to illustrate the principles and implementations of the present disclosure, and the description of the above embodiments is only used to help understand the method of the present disclosure and its core ideas, and the contents of this specification shall not be construed as a limitation of the present disclosure. At the same time, for the general technical personnel in the field, based on the idea of the present disclosure, can make any modification, equivalent replacement or improvement on the specific implementation and application scope, which should be included in the scope of the claims of the present disclosure.

What is claimed is:

1. A base station, comprising:
a base body;
a landing pad, provided on the base body;
a base station opening and closing structure movably disposed on the base body, the base station opening and closing structure comprising an open state and a closed state; and
a control system,
wherein in the open state, the base station opening and closing structure provides a landing space for an aerial vehicle to land on the landing pad, and in the closed state, the base station opening and closing structure provides an accommodating space to accommodate the aerial vehicle,
during a process of the base station opening and closing structure transitioning from the open state to the closed state, the base station opening and closing structure is configured to propel some blades of the aerial vehicle partially protruding out of the accommodating space to fold or retract so as to accommodate the aerial vehicle within the accommodating space,
the base station opening and closing structure further comprises an intermediate state between the open state and the closed state, wherein when the base station opening and closing structure is in the intermediate state, the base station opening and closing structure is in contact with the blades to propel the blades to retract, and
at a time that the aerial vehicle landing on the landing pad and the base station opening and closing structure is in the intermediate state, the control system is configured to control the blades of the aerial vehicle to rotate, such that the blades have a first tip speed, and simultaneously control the base station opening and closing structure to close at a second speed, the first tip speed is greater than the second speed.

2. The base station of claim 1, wherein an area enclosed by a boundary of the accommodating space is determined based on a) an area enclosed by projections of first driving structures for driving the blades of the aerial vehicle on a plane where the landing pad is located and/or b) landing accuracy of the aerial vehicle.

3. The base station of claim 2, wherein the area enclosed by the boundary of the accommodating space is greater than the area enclosed by the projections of the first driving structures for driving the blades of the aerial vehicle on the plane where the landing pad is located, and/or
the area enclosed by the projections of the first driving structures for the blades of the aerial vehicle on the plane where the landing pad is located is a rectangular area enclosed by the projections of the first driving structures for driving the blades of the aerial vehicle on the plane where the landing pad is located, the projections of the first driving structures for driving the blades of the aerial vehicle are vertices of the rectangular area.

4. The base station of claim 1, wherein the base station opening and closing structure is configured to cause the blades of the aerial vehicle accommodated in the accommodating space to stay in a stationary and retracted state when the base station opening and closing structure is in the closed state.

5. The base station of claim 1, wherein when the base station opening and closing structure is in the intermediate state, the control system is further configured to control the blades to rotate such that first blades protruding out of the accommodating space at edges of the accommodating space along an opening and closing direction of the base station opening and closing structure each rotate in a direction against a closing direction of a corresponding protective cover of the base station opening and closing structure.

6. The base station of claim 1, wherein the base station opening and closing structure comprises a pair of protective covers, the pair of protective covers are disposed symmetrically on opposite sides of the base body.

7. The base station of claim 6, wherein each of the protective covers has a top wall, a first side wall and two second side walls opposite each other, the two second side walls are connected to opposite sides of the first side wall, and the top wall is connected to the first side wall and to the two second side walls opposite each other, respectively.

8. The base station of claim 7, wherein when the base station opening and closing structure is in the intermediate state, an end side surface of at least one of the two second sidewalls of the protective cover touches the blades to propel the blades to fold or retract.

9. The base station of claim 8, wherein a structure is provided on the end side surface of the at least one of the two second sidewalls of the protective cover to change a direction of a propelling force exerted by the base station opening and closing structure on the end side surface.

10. The base station of claim 6, further comprising:
a driving structure comprising a second driving structure to drive the protective cover in motion,
wherein the control system is further configured to detect a torque of the second driving structure, and to control the second driving structure to rotate forward or reverse based on a magnitude of the detected torque of the second driving structure, and when the torque is higher than a predetermined value, the second driving structure is controlled to change rotation direction.

11. The base station of claim 1, further comprising:
a control system, wherein the control system is configured to:
detect a position of the blades and a position of at least one moving structure in the base station opening and closing structure; and
control at least one of a rotational speed of the blades and a speed of the at least one moving structure in the base station opening and closing structure based on the position of the blades and the position of the at least one moving structure in the base station opening and closing structure.

12. The base station of claim 1, wherein the base station opening and closing structure comprises a pair of protective covers, the pair of protective covers are disposed symmetrically on opposite sides of the base body.

13. The base station of claim 12, wherein a top surface of the protective cover is not higher than the landing pad when the base station opening and closing structure is in the open state.

14. The base station of claim 12, further comprising:
a pair of second driving structures, each of the second driving structures provided between a side of the base body and one of the protective covers to drive the one of the protective covers to move relative to the base body.

15. The base station of claim 14, wherein the second driving structure comprises:
a drive motor;
a motor drive shaft, provided on one side of the base body; and
a rocker arm, one end of the rocker arm is fixedly connected to one end of the motor drive shaft and the other end is movably connected to the protective cover,
wherein the drive motor drives the rocker arm to swing by driving the motor drive shaft to rotate.

16. The base station of claim 12, further comprising:
a heater to heat a seam of the pair of the protective covers.

17. The base station of claim 12, further comprising:
at least one of a weather station, an antenna, a camera, a rain gauge, an anemometer, a wind gauge, a temperature sensor, or a humidity sensor at a top of one of the protective covers.

18. A movable platform system, comprising:
an aerial vehicle; and
a base station, the base station comprising:
a base body;
a landing pad, provided on the base body;
a base station opening and closing structure movably disposed on the base body, the base station opening and closing structure comprising an open state and a closed state;
a control system,
wherein in the open state, the base station opening and closing structure provides a landing space for an aerial vehicle to land on the landing pad, and in the closed state, the base station opening and closing structure provides an accommodating space to accommodate the aerial vehicle,
during a process of the base station opening and closing structure transitioning from the open state to the closed state, the base station opening and closing structure is configured to propel some blades of the aerial vehicle partially protruding out of the accommodating space to fold or retract so as to accommodate the aerial vehicle within the accommodating space, the base station opening and closing structure further comprises an intermediate state between the open state and the closed state, wherein when the base station opening and closing structure is in the intermediate state, the base station opening and closing structure is in contact with the blades to propel the blades to retract, and at a time that the aerial vehicle landing on the landing pad and the base station opening and closing structure is in the intermediate state, the control system is configured to control the blades of the aerial vehicle to rotate, such that the blades have a first tip speed, and simultaneously control the base station opening and closing structure to close at a second speed, the first tip speed is greater than the second speed.

* * * * *